(12) United States Patent
Al et al.

(10) Patent No.: US 12,525,106 B2
(45) Date of Patent: Jan. 13, 2026

(54) ELECTRONIC DEVICE, CLOUD DEVICE, CLIENT DEVICE, AND OPERATING METHODS THEREFOR

(71) Applicant: SHENZHEN MICROBT ELECTRONICS TECHNOLOGY CO., LTD., Guangdong (CN)

(72) Inventors: Guo Al, Guangdong (CN); Zuoxing Yang, Guangdong (CN)

(73) Assignee: SHENZHEN MICROBT ELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/112,083

(22) PCT Filed: Jan. 10, 2024

(86) PCT No.: PCT/CN2024/071597
§ 371 (c)(1),
(2) Date: Mar. 14, 2025

(87) PCT Pub. No.: WO2024/259960
PCT Pub. Date: Dec. 26, 2024

(65) Prior Publication Data
US 2025/0259519 A1  Aug. 14, 2025

(30) Foreign Application Priority Data
Jun. 20, 2023 (CN) .......................... 202310731036.6

(51) Int. Cl.
*G08B 13/196* (2006.01)
(52) U.S. Cl.
CPC ................ *G08B 13/19654* (2013.01); *G08B 13/19652* (2013.01)

(58) Field of Classification Search
CPC ................ G06V 20/52; G06V 20/44; G08B 13/19695; B60R 25/1004; H04N 7/185
See application file for complete search history.

(56) References Cited

U.S. PATENT DOCUMENTS

| 7,015,806 B2 * | 3/2006 | Naidoo ............ G08B 13/19691 |
| | | 348/E7.086 |
| 10,769,909 B1 * | 9/2020 | Modestine ............. G06V 20/52 |

(Continued)

FOREIGN PATENT DOCUMENTS

| CN | 105160837 A | 12/2015 |
| CN | 110825592 A | 2/2020 |

(Continued)

*Primary Examiner* — Mirza F Alam
(74) *Attorney, Agent, or Firm* — Dickinson Wright PLLC

(57) ABSTRACT

An electronic device, a cloud device, a client device, and operating methods therefor are provided. A method of operating an electronic device including a camera module configured to capture a video and having a first state, in which the camera module is activated to capture a video, includes: in response to that an event in one or more types of events is detected, in a case where the electronic device is in the first state, transmitting an alarm message indicating that the event is detected, and transmitting, as an alarm video, a video captured by the camera module after the event is detected; and after the alarm message is transmitted, in response to that an event in the one or more types of events is detected, not transmitting an alarm message indicating that the event is detected but continuing transmitting the video captured by the camera module.

15 Claims, 10 Drawing Sheets

(56) References Cited

U.S. PATENT DOCUMENTS

| | | | |
|---|---|---|---|
| 2008/0316312 A1* | 12/2008 | Castillo | B60R 25/1004 348/E7.086 |
| 2014/0321706 A1* | 10/2014 | Jackson | G08B 13/19656 382/103 |
| 2015/0098613 A1* | 4/2015 | Gagvani | G08B 13/19697 382/103 |
| 2015/0154854 A1 | 6/2015 | Morehead | |

FOREIGN PATENT DOCUMENTS

| | | |
|---|---|---|
| CN | 111292514 A | 6/2020 |
| CN | 112202990 A | 1/2021 |
| CN | 112383756 A | 2/2021 |
| CN | 112597899 A | 4/2021 |
| CN | 112633184 A | 4/2021 |
| CN | 113179423 A | 7/2021 |
| CN | 113542675 A | 10/2021 |
| CN | 113778806 A | 12/2021 |
| CN | 114143748 A | 3/2022 |
| CN | 115412381 A | 11/2022 |
| CN | 116206431 A | 6/2023 |
| CN | 116527853 A | 6/2023 |

\* cited by examiner

ELECTRONIC DEVICE, CLOUD DEVICE, CLIENT DEVICE, AND OPERATING METHODS THEREFOR

CROSS-REFERENCE TO RELATED APPLICATIONS

This application is a national stage of International Application No. PCT/CN2024/071597, filed on Jan. 10, 2024, which claims priority to Chinese Patent Application No. 202310731036.6 filed on Jun. 20, 2023. Both of the aforementioned applications are hereby incorporated by reference in their entireties.

TECHNICAL FIELD

The present disclosure relates to the field of video surveillance, and in particular, to an electronic device using a camera and a method of operating the same, and further relates to a cloud device and a client device that can cooperate with the electronic device, and methods of operating the same.

BACKGROUND

Video surveillance devices always have to strike a balance between performance and power consumption. Continuous Video Recording (CVR) is desirable in providing comprehensive video surveillance data, but the power consumption level required by CVR is often daunting for video surveillance devices (especially for those using battery-powered cameras). As a result, an increasing number of video surveillance devices that use battery-powered cameras are designed as Event-based Video Recording (EVR). EVR does not record videos all day like CVR, but only records video clips associated with detection of specific events, which makes the power consumption level required by EVR much lower than that required by CVR, thus making it more suitable for video surveillance devices that use battery-powered cameras.

SUMMARY

According to a first aspect of the present disclosure, a method of operating an electronic device is provided, the electronic device including a camera module configured to capture a video, the electronic device having a first state in which the camera module is activated to capture a video, the method including: in response to that an event in one or more types of events is detected, in a case where the electronic device is in the first state, transmitting an alarm message indicating that the event is detected, and transmitting, as an alarm video, a video captured by the camera module after the event is detected; and after the alarm message is transmitted, in response to that an event in the one or more types of events is detected, not transmitting an alarm message indicating that the event is detected but continuing transmitting the video captured by the camera module.

According to a second aspect of the present disclosure, an electronic device is provided, the electronic device including: a camera module configured to capture a video; one or more processors; and a memory storing computer-executable instructions which, when executed by the one or more processors, cause the one or more processors to perform the method of operating an electronic device according to the first aspect of the present disclosure.

According to a third aspect of the present disclosure, a method of operating a cloud device is provided, including: in response to that an event in one or more types of events is detected, receiving and storing an alarm message indicating that the event is detected and an alarm video associated with the event; and after the alarm message is received, in response to that an event in the one or more types of events is detected, receiving and storing an alarm video associated with the event without receiving an alarm message indicating that the event is detected anymore.

According to a fourth aspect of the present disclosure, a cloud device is provided, the cloud device including: one or more processors; and a memory storing computer-executable instructions which, when executed by the one or more processors, cause the one or more processors to perform the method of operating a cloud device according to the third aspect of the present disclosure.

According to a fifth aspect of the present disclosure, a method of operating a client device is provided, including: in response to that an event in one or more types of events is detected, receiving an alarm message indicating that the event is detected and an alarm video associated with the event; and after the alarm message is received, in response to that an event in the one or more types of events is detected, receiving an alarm video associated with the event without receiving an alarm message indicating that the event is detected anymore.

According to a sixth aspect of the present disclosure, a client device is provided, the client device including: one or more processors; and a memory storing computer-executable instructions which, when executed by the one or more processors, cause the one or more processors to perform the method of operating a client device according to the fifth aspect of the present disclosure.

Further features and advantages of the present disclosure will become more apparent from the following detailed description of exemplary embodiments of the present disclosure with reference to the accompanying drawings.

BRIEF DESCRIPTION OF THE DRAWINGS

The accompanying drawings that constitute a part of the specification illustrate embodiments of the present disclosure, and are used to explain the principle of the present disclosure together with the specification.

The present disclosure will be more clearly understood from the following detailed description with reference to the accompanying drawings, in which.

Note that in the implementations described below, sometimes the same reference signs are commonly used in different accompanying drawings to represent the same parts or parts with the same functions, and the repeated description thereof is omitted. In the description, similar numbers and letters are used to represent similar items. Therefore, once an item is defined in an accompanying drawing, the item in subsequent accompanying drawings will not be further discussed.

For ease of understanding, positions, dimensions, ranges, and the like of structures shown in the accompanying drawings and the like sometimes do not represent actual positions, dimensions, ranges, and the like. Therefore, the disclosed invention is not limited to the positions, dimensions, ranges, and the like disclosed in the accompanying drawings and the like. Moreover, the accompanying drawings are not necessarily drawn to scale, and some features may be exaggerated to show the details of specific components.

DETAILED DESCRIPTION

The following describes in detail various exemplary embodiments of the present disclosure with reference to the accompanying drawings. It should be noted that, unless specified otherwise, relative arrangements of components and steps, numerical expressions and values set forth in the embodiments do not limit the scope of the present disclosure.

The following descriptions of at least one exemplary embodiment is actually only illustrative and does not constitute any limitation on the present disclosure or its application or use. Those skilled in the art will understand that they only illustrate the exemplary manner for implementing the present disclosure, rather than exhaustive manners.

Techniques, methods and devices known to those having ordinary skills in the related art may not be discussed in detail, but in appropriate cases, the techniques, methods and devices should be considered as part of the description.

Figure 17:
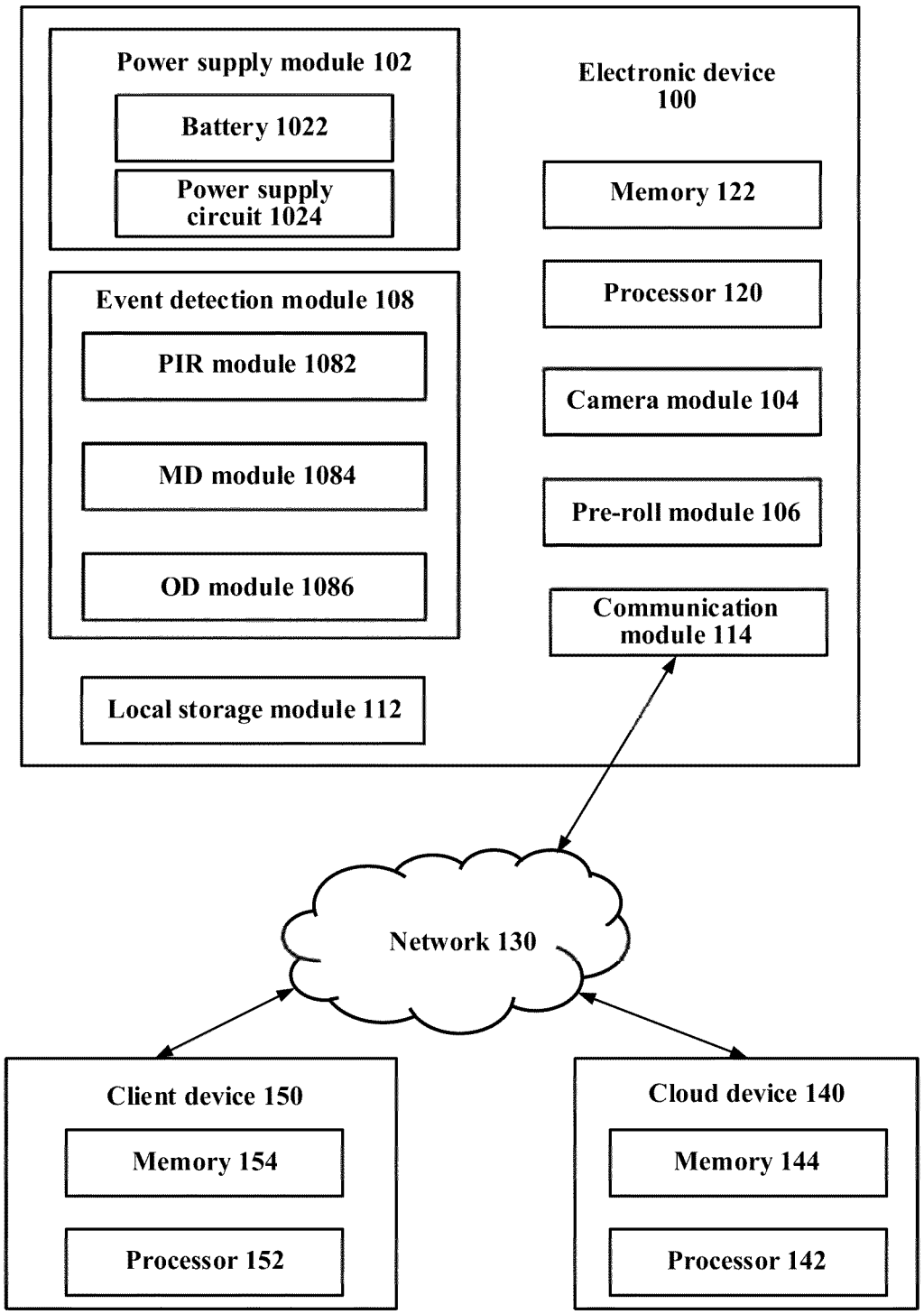
FIG. 17 is a schematic block diagram illustrating a non-limiting example system on which one or more embodiments of the present disclosure may be implemented, the system including an electronic device, a cloud device, and a client device according to some embodiments of the present disclosure.

FIG. 17 illustrates a schematic block diagram of a non-limiting example system on which one or more embodiments of the present disclosure may be implemented. The system includes an electronic device 100 according to some embodiments of the present disclosure, and further includes a network(s) 130, a cloud device(s) 140 (which may be, for example but not limited to, a cloud platform, a server, a data center, and the like), and a client device(s) 150 (which may be, for example but not limited to, a mobile phone, a wearable device, a tablet computer, a laptop computer, a personal computer, a personal digital assistant, and the like). The electronic device 100 may communicate with the cloud device 140 via the network 130, for example, may transmit data to the cloud device 140 for processing and/or storage. The electronic device 100 may also communicate with the client device 150 via the network 130, for example, may receive a request of a user from the client device 150 or transmit data to the client device 150 for the user to view. The cloud device 140 may also communicate with both the electronic device 100 and the client device 150 via the network 130, so as to receive the data from the electronic device 100 for processing and/or storage, receive the request of the user from the client device 150 or transmit the data to the client device 150 for the user to view, and/or forward the data/request between the electronic device 100 and the client device 150. For the purpose of non-restrictive illustration, in an example application scenario, the electronic device 100 may be an electronic doorbell, the client device 150 may be a mobile phone of the user, and the cloud device 140 may be a cloud platform.

As shown in FIG. 17, the electronic device 100 may include a camera module 104. The camera module 104 is configured to capture a video. For example, the camera module 104 may include a high-power consumption video recording chip and an image sensor. The electronic device 100 can support a function of switching on and off the modules thereof separately, so that it can achieve different power consumption levels by differently controlling the powering on and powering off of the modules in different states. In some examples, the electronic device 100 may switch between a first state and a second state (for example, in response to detection of an event). In the first state, the camera module 104 is activated to capture a video. In the second state, the camera module 104 is deactivated. The electronic device 100 may have a lower power consumption level in the second state than in the first state. For example, the first state may be a wakeup state of the electronic device 100, and the second state may be a sleep state of the electronic device 100. In some examples, the electronic device 100 may be kept in the first state. A case in which the electronic device 100 is allowed to switch between the first state and the second state (for example, in response to detection of an event) may have a lower power consumption level than a case in which the electronic device 100 is kept in the first state.

In some embodiments, the electronic device 100 may include a power supply module 102, which is configured to supply power to the electronic device 100. In some examples, the power supply module 102 may include a battery 1022 and/or a power supply circuit 1024. The battery 1022 is configured to supply power to the electronic device 100 by using electric power stored therein. The power supply circuit 1024 is configured to be connected to an external power supply to supply power to the electronic device 100 by using electric power from the external power supply. In some examples, when the battery 1022 is a rechargeable battery, the power supply circuit 1024 may also be configured to charge the battery 1022 by using the electric power from the external power supply.

In some embodiments, the electronic device 100 may include a pre-roll module 106. The pre-roll module 106 may be configured to capture a video with lower power consumption than the camera module 104. For example, the pre-roll module 106 may include a low-power consumption video recording chip and an image sensor. For example, the camera module 104 may be configured to perform event-based video recording, and the pre-roll module 106 may record videos in cycles independently in a low-power consumption mode when the camera module 104 is powered off. Therefore, prior to a video clip that is associated with a detected event and recorded by the camera module 104, the electronic device 100 can attach a video clip recorded by the pre-roll module 106 during a period of time before the event is detected, thereby allowing the user to more clearly know the specific context of the event. In this way, the electronic device 100 neither consumes too much power, nor generates a large amount of junk data, and it is not prone to miss key information, so as to prolong the service life of the battery and improve user experience when use by the user is satisfied.

In another embodiment, the electronic device 100 may include an event detection module 108. Through cooperation of the event detection module 108 and the camera module 104, the electronic device 100 may have an EVR capability. The event detection module 108 may be configured to be able to detect different types of events. For example, the event detection module 108 may be configured to detect one or more types of events in which the user are interested. In the embodiment shown in FIG. 17, the event detection module 108 includes a passive infrared (PIR) module 1082, a motion detection (MD) module 1084, and an object detection (OD) module 1086. For example, the PIR module 1082 may detect the PIR event by detecting a change in an infrared radiation level. The MD module 1084 may detect a motion event by comparing pixel changes between consecutive image frames in combination with a motion detection algorithm. The OD module 1086 may analyze, by means of an intelligent algorithm such as an image recognition or classification algorithm, whether an image frame includes an object to detect an object event. For example, such an object may be, but is not limited to, a humanoid shape, a pet, a vehicle, or the like. These are merely non-restrictive example implementations of the PIR module 1082, the MD module 1084, and the OD module 1086. It may be understood that any suitable method currently known or later developed may also be used to detect an event. In some examples, an event detection sensitivity level of the event detection module 108 may be configurable, for example, may be configured in three levels: "high", "medium", and "low", and may be "medium" by default. Alternatively, in some embodiments, the electronic device 100 itself may be not provided with the event detection module 108, but communicates with an event detection device external to the electronic device 100. When detecting an event, the external event detection device may instruct the electronic device 100 to activate the camera module 104 to start video recording. In some embodiments, when the electronic device 100 is not provided with the pre-roll module 106, the camera module 104 may be first activated by detecting the PIR event using the PIR module 1082, and then an image frame captured by the camera module 104 is processed by using the MD module 1084 and/or the OD module 1086 to further detect the motion event and/or the object event, so that operations such as secondary verification can be performed. In some embodiments, when the electronic device 100 is provided with the pre-roll module 106, the MD module 1084 and/or the OD module 1086 may process an image frame captured by the pre-roll module 106 to detect the motion event and/or the object event to activate the camera module 104, and then process an image frame captured by the camera module 104 to further detect the motion event and/or the object event, so that operations such as secondary verification can be performed.

For example, in a case where the electronic device 100 may switch between the first state and the second state in response to the detection of an event, the event that the event detection module 108 is configured to detect may be considered as a video recording triggering event. Through cooperation of the event detection module 108 and the camera module 104, the electronic device 100 may completely record the event. For example, after the camera module 104 starts video recording in response to that an event is detected, the event detection module 108 may continuously or periodically detect whether an event occurs, and if it is determined that an event occurs, the camera module 104 is caused to continue video recording, or if it is determined that no event occurs, the camera module 104 is caused to stop video recording. Therefore, the camera module 104 can completely record from the beginning to the end of an event. For example, the video recording triggering event may be further divided into an alarm triggering event and a non-alarm triggering event. When the alarm triggering event is detected, the electronic device 100 not only can activate the camera module 104 to capture a video, but also can transmit an alarm message and an alarm video (for example, through a communication module 114 of the electronic device 100). When the non-alarm triggering event is detected, the electronic device 100 may only activate the camera module 104 to capture a video but not transmit the alarm message and the alarm video. In some examples, the PIR event may be the non-alarm triggering event, and the motion event and the object event may be the alarm triggering event. It may be understood that, for example, in a case in which the electronic device 100 is kept in the first state all the time (performing video recording all the time), the event that the event detection module 108 is configured to detect may also include the alarm triggering event and the non-alarm triggering event. However, detection of the event may only determine whether an alarm is triggered without causing state switching of the electronic device 100 anymore.

In some embodiments, the electronic device 100 may include a local storage module 112, which may be configured to locally store videos recorded by the camera module 104 and/or the pre-roll module 106. For example, the local storage module 112 may be, but is not limited to, in a form of a Transflash (TF) card or an Embedded multimedia card (eMMC) or the like. Alternatively, in some other embodiments, the electronic device 100 itself may not be provided with the local storage module 112, but communicates with a local storage device external to the electronic device 100. Additionally or alternatively, in some embodiments, the electronic device 100 may further store the videos recorded by the camera module 104 and/or the pre-roll module 106 at the cloud device 140 via the communication module 114 of the electronic device 100. For example, the cloud device 140 may be a cloud platform providing a cloud storage service.

The electronic device 100 may further include a processor(s) 120 and a memory 122 storing computer-executable instructions which, when executed by the processor 120, cause the processor 120 to perform a method of operating the electronic device 100. For example, the processor 120 may be a central processing unit (CPU) of the electronic device 100. The processor 120 may be any type of general-purpose processor, or may be a processor specifically designed for operating the electronic device 100, such as an application-specific integrated circuit ("ASIC"). The memory 122 may include various computer-readable media that are accessible by the processor 120. In various embodiments, the memory 122 described herein may include volatile and non-volatile media, and removable and non-removable media. For example, the memory 122 may include any combination of the following: a random access memory ("RAM"), a dynamic RAM ("DRAM"), a static RAM ("SRAM"), a read-only memory ("ROM"), a flash memory, a cache memory, and/or any other type of non-transitory computer-readable medium. The memory 122 may store instructions that, when executed by the processor 120, cause the processor 120 to perform the method of operating the electronic device 100. The method of operating an electronic device 100 according to various embodiments of the present disclosure will be described in detail below with reference to the accompanying drawings.

Figure 1:
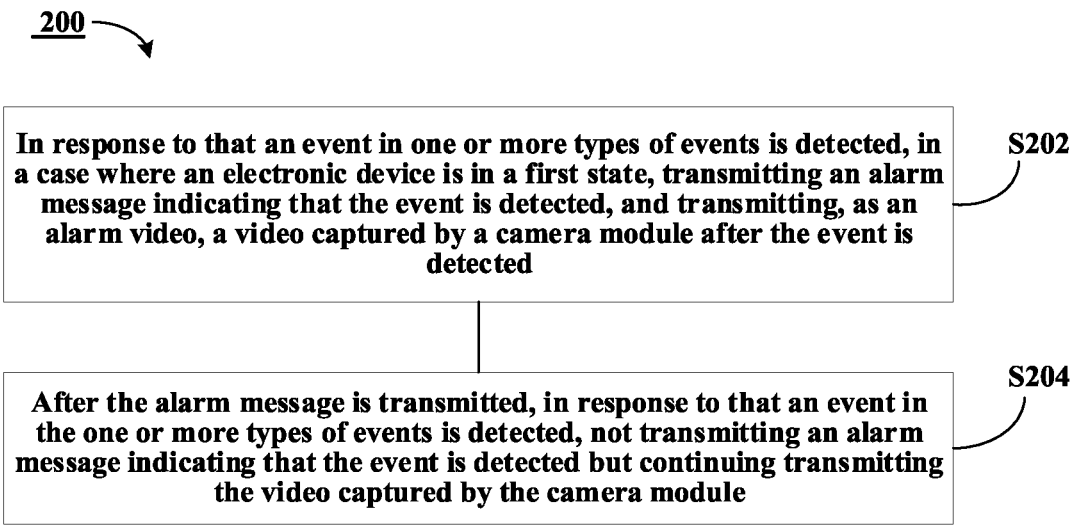
FIG. 1 is a flowchart illustrating a method of operating an electronic device according to some embodiments of the present disclosure.

FIG. 1 illustrates a flowchart of a method 200 for operating an electronic device 100 according to some embodiments of the present disclosure. As described above, the electronic device 100 may have the first state in which the camera module 104 is activated to capture a video. As shown in FIG. 1, the method 200 includes: at block S202, in response to that an event in one or more types of events is detected, in a case where the electronic device 100 is in the first state, transmit an alarm message indicating that the event is detected, and transmit, as an alarm video, a video captured by the camera module 104 after the event is detected; at block S204, after the alarm message is transmitted, in response to that an event in the one or more types of events is detected, not transmitting an alarm message indicating that the event is detected but continuing transmitting the video captured by the camera module 104.

The one or more types of events may be various events which the event detection module 108 of the electronic device 100 or the event detection device external to the electronic device 100 is configured to detect, and may include, for example, one or more of the PIR event, the motion event, or the object event (for example, a humanoid event or a pet event).

In some embodiments, the method 200 may further include: after the alarm message is transmitted, in response to that no event in the one or more types of events is detected, stop transmitting the video captured by the camera module 104.

In some embodiments, the electronic device 100 may further have the second state in which the camera module 104 is deactivated, and the method 200 may further include: causing the electronic device 100 to be in the second state by default; in response to that the event in the one or more types of events is detected, causing the electronic device 100 to switch from the second state to the first state, wherein transmission of the alarm message and the alarm video is performed after the electronic device 100 switches from the second state to the first state. In some embodiments, the method 200 may further include: after the alarm message is transmitted, in response to that no event in the one or more types of events is detected, causing the electronic device 100 to switch from the first state back to the second state.

Figure 2:
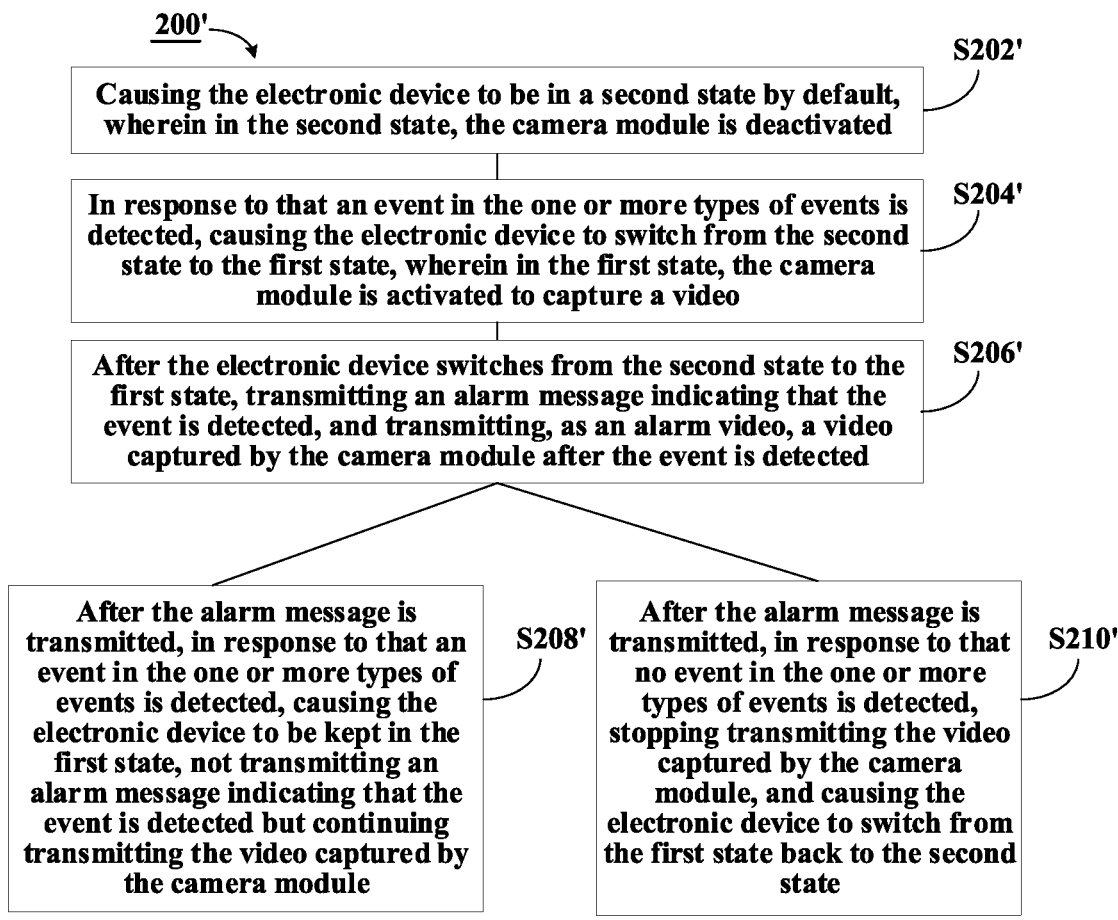
FIG. 2 is a flowchart illustrating a method of operating an electronic device according to some embodiments of the present disclosure.

For example, FIG. 2 shows a non-limiting example method 200' of the method 200. As shown in FIG. 2, the method 200' includes: at block S202', causing the electronic device 100 to be in the second state by default in which the camera module 104 is deactivated; at block S204', in response to that an event in the one or more types of events is detected, causing the electronic device 100 to switch from the second state to the first state in which the camera module 104 is activated to capture a video; at block S206', after the electronic device 100 switches from the second state to the first state, transmitting an alarm message indicating that the event is detected, and transmitting, as an alarm video, a video captured by the camera module 104 after the event is detected; at block S208', after the alarm message is transmitted, in response to that an event in the one or more types of events is detected, causing the electronic device 100 to be kept in the first state, not transmitting an alarm message indicating that the event is detected but continuing transmitting the video captured by the camera module 104; or at block S210', after the alarm message is transmitted, in response to that no event in the one or more types of events is detected, stopping transmitting the video captured by the camera module 104, and causing the electronic device 100 to switch from the first state back to the second state.

In some embodiments, when the electronic device 100 is provided with the pre-roll module 106, the pre-roll module 106 is also activated in the second state to capture a video, and the pre-roll module 106 is also deactivated in the first state. Therefore, the transmitted alarm video may also include a video captured by the pre-roll module 106 before the event is detected.

Figure 3:
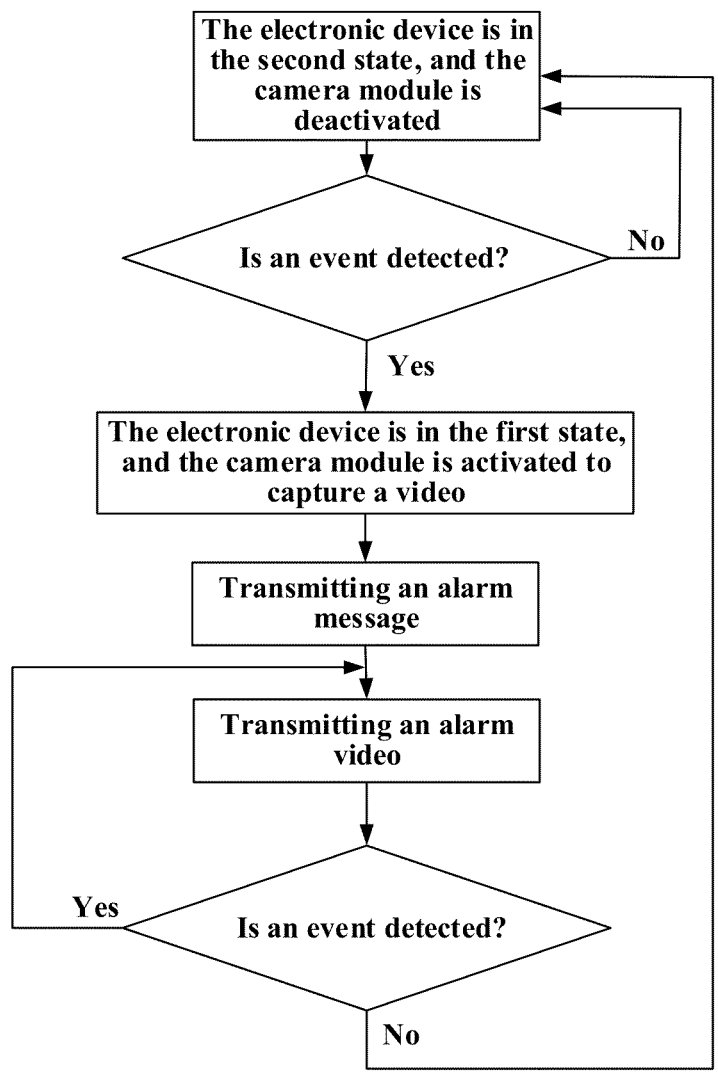
FIG. 3 is a flowchart illustrating an example implementing process for a method of operating an electronic device according to some embodiments of the present disclosure.

Specifically, for example, referring to FIG. 3, the electronic device 100 is initially in the second state. In this case, the camera module 104 is deactivated, and event detection is performed (for example, continuously or periodically) during this period. If no event is detected, the electronic device 100 is kept in the second state. If an event is detected, the electronic device 100 enters the first state. In this case, the camera module 104 is activated to capture a video. Then, an alarm message indicating that the event is detected is transmitted, and an alarm video associated with the event is also transmitted. Event detection continues to be performed (for example, continuously or periodically) during this period. If an event is detected, the electronic device 100 is kept in the first state, but in this case, only the alarm video is transmitted without additionally transmitting an alarm message indicating that the event is detected anymore. Once no event is detected, the electronic device 100 returns to the second state. In this case, naturally, no transmission operation is performed anymore.

Figure 4:
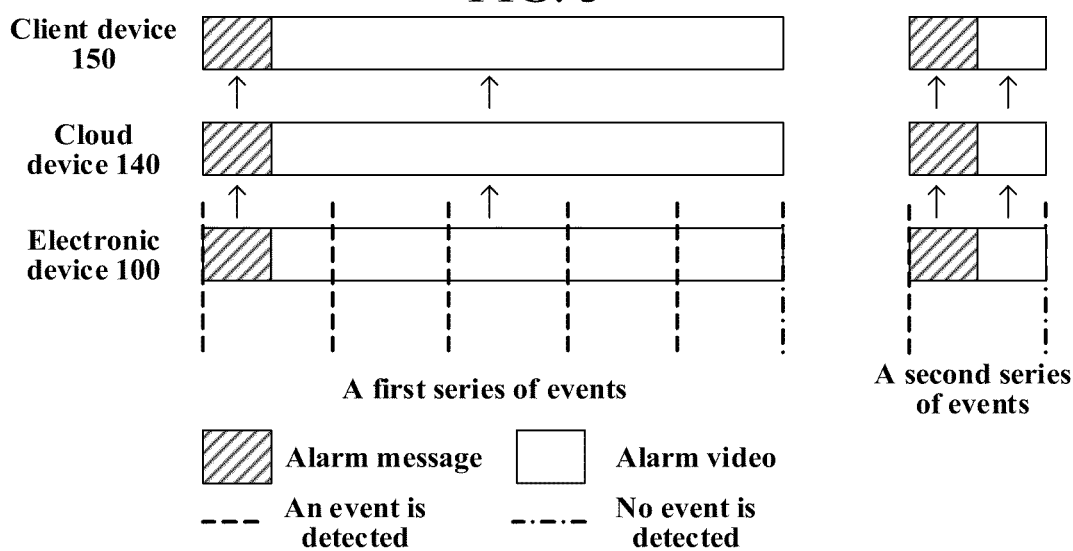
FIG. 4 is a schematic view illustrating a data mapping relationship among an electronic device, a cloud device, and a client device in the example implementation process shown in FIG. 3.

FIG. 4 shows a data mapping relationship among the electronic device 100, the cloud device 140, and the client device 150 in the case shown in FIG. 3. In the example shown in FIG. 4, the electronic device 100 is configured to transmit the alarm message and the alarm video to the cloud device 140, and the cloud device 140 is configured to transmit the alarm message and the alarm video to the client device 150. In some other examples, the electronic device 100 may also be configured to transmit the alarm message and the alarm video to the client device 150 not via the cloud device 140. Herein, an example in which the cloud device 140 is used as an intermediate between the electronic device 100 and the client device 150 is mainly used for description.

However, it may be understood that this specification is also applicable to a case in which the electronic device 100 directly interacts with the client device 150.

As shown in FIG. 4, when the earliest event in a first series of events is detected, after being woken up, the electronic device 100 pushes an alarm message to the client device 150 via the cloud device 140, and starts to push an alarm video to the client device 150 via the cloud device 140. After that, when a subsequent event in the first series of events is detected, the electronic device 100 keeps video recording and continuously pushes the alarm video, but does not push any more alarm message, until the electronic device 100 sleeps when the first series of events end. After a while, when the earliest event in a second series of events is detected, after being woken up, the electronic device 100 pushes a new alarm message to the client device 150 via the cloud device 140, and starts to push an alarm video to the client device 150 via the cloud device 140. After that, when a subsequent event in the second series of events is detected, the electronic device 100 keeps video recording and continuously pushes the alarm video, but does not push any more alarm message, until the electronic device 100 sleeps when the second series of events end. It may be understood that the series of events described herein may be, for example, multiple events associated with each other that are caused by an object (for example, a person or a pet) appearing in a field of view of the electronic device 100, continuously performing activities in the field of view, and then leaving the field of view. Every event in the same series of events does not necessarily have the same type. For example, the first series of events may be caused by a person appearing in the field of view of the electronic device 100, continuously performing activities in the field of view, and then leaving the field of view. Therefore, the first series of events may include a combination of (one or more) PIR events, (one or more) motion events, and (one or more) humanoid events. The second series of events may be caused by, after the person leaves the field of view, a pet appearing in the field of view, continuously performing activities in the field of view, and then leaving the field of view. Therefore, the second series of events may include a combination of (one or more) PIR events, (one or more) motion events, and (one or more) pet events.

In this way, if events of interest occur at the electronic device 100 all the time, the camera module 104 of the electronic device 100 may capture videos all the time to completely record from the beginning to the end of the events, and all the captured videos may also be pushed to the client device 150. However, for the same series of events, the electronic device 100 pushes the alarm message only once. In this way, the user will not be disturbed by frequent alarms, and can view a complete alarm video, thereby obtaining improved experience.

Figure 11:
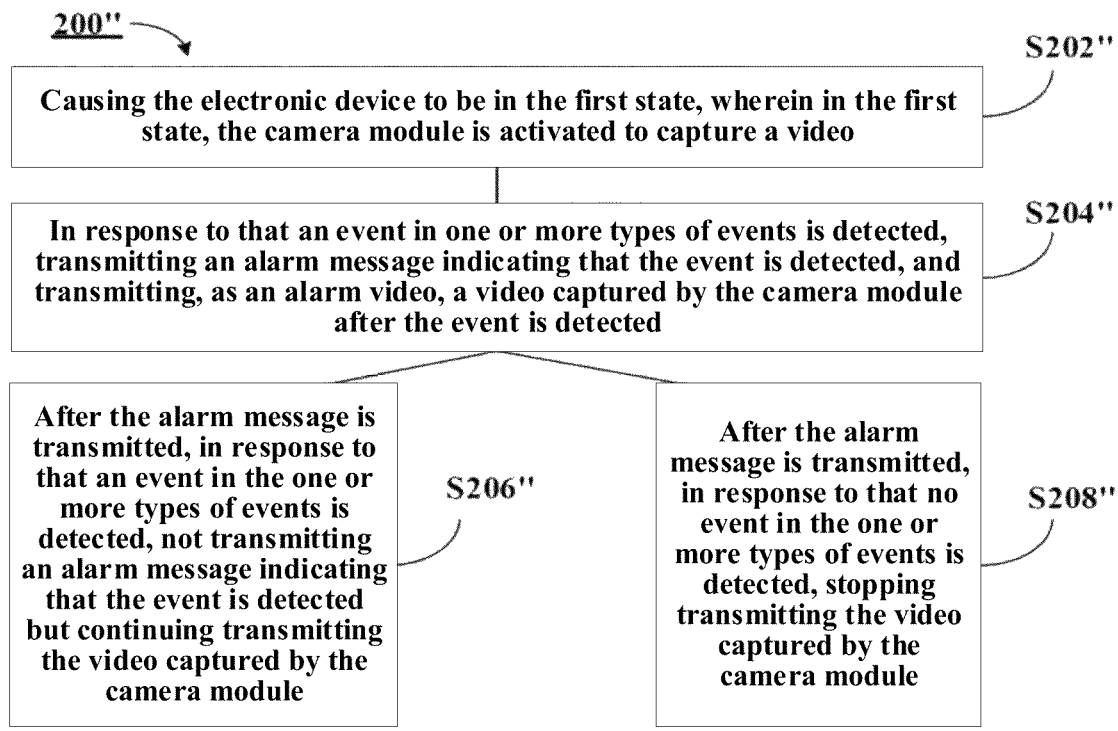
FIG. 11 is a flowchart illustrating a method of operating an electronic device according to some embodiments of the present disclosure.

In some embodiments, the method 200 may include: causing the electronic device 100 to be kept in the first state. For example, FIG. 11 shows another non-limiting example method 200" of the method 200. A difference between the method 200" and the method 200' mainly lies in that the electronic device 100 no longer switches between the first state and the second state, but is in the first state all the time, where event detection only affects transmission of the alarm message and the alarm video, but does not affect an operation state of the camera module. Specifically, as shown in FIG. 11, the method 200" includes: at block S202", causing the electronic device 100 to be in the first state in which the camera module 104 is activated to capture a video; at block S204", in response to that an event in one or more types of events is detected, transmitting an alarm message indicating that the event is detected, and transmitting, as an alarm video, a video captured by the camera module 104 after the event is detected; at block S206", after the alarm message is transmitted, in response to that an event in the one or more types of events is detected, not transmitting an alarm message indicating that the event is detected but continuing transmitting the video captured by the camera module 104; or at block S208", after the alarm message is transmitted, in response to that no event in the one or more types of events is detected, stopping transmitting the video captured by the camera module 104.

Figure 12:
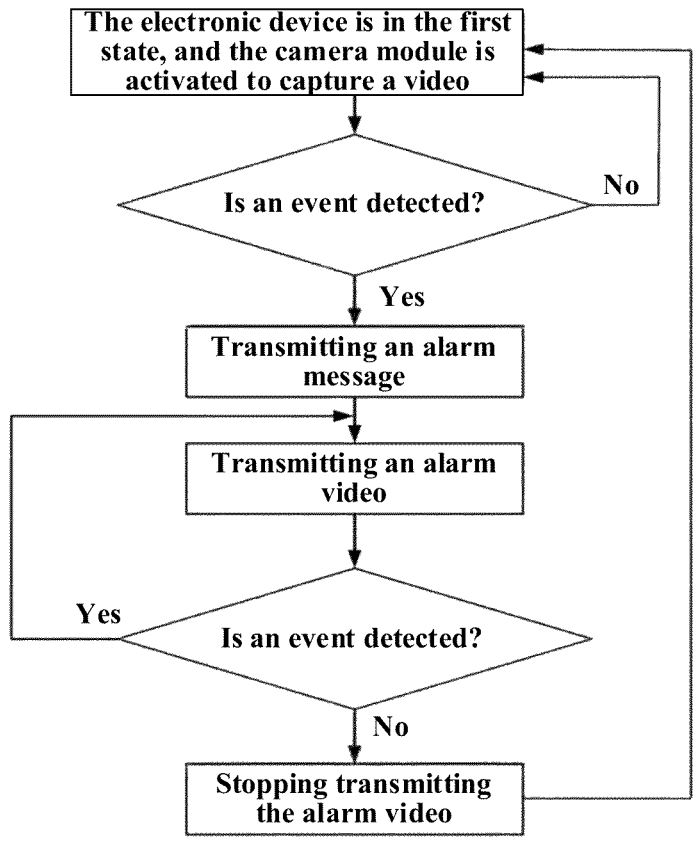
FIG. 12 is a flowchart illustrating an example implementation process for a method of operating an electronic device according to some embodiments of the present disclosure.

Specifically, for example, referring to FIG. 12, the electronic device 100 is always in the first state, the camera module 104 is activated to capture a video, and event detection is performed (for example, continuously or periodically) during this period. If no event is detected, the electronic device 100 is kept in the first state and does not perform a transmission operation. If an event is detected, the electronic device 100 transmits an alarm message indicating that the event is detected, and further transmits an alarm video associated with the event. Event detection continues to be performed (for example, continuously or periodically) during this period. If an event is detected, the electronic device 100 is kept in the first state, but in this case, only the alarm video is transmitted without additionally transmitting an alarm message indicating that the event is detected anymore. Once no event is detected, the electronic device 100 is kept in the first state without performing transmission operations.

The following describes more embodiments of the method 200 in detail with reference to FIG. 5 to FIG. 10. Although FIG. 5 to FIG. 10 illustrate from the perspective of the method 200', this is merely exemplary and is not restrictive. It may be understood that these embodiments may be applicable to/combined with various embodiments of the method 200, including but not limited to the methods 200' and 200".

In some embodiments, the method 200 may include after the alarm message is transmitted, in response to that an event in the one or more types of events is detected: in response to determining that a preset alarm time interval has not elapsed since last transmission of the alarm message, not transmitting an alarm message indicating that the event is detected but continuing transmitting the video captured by the camera module 104; or in response to determining that a preset alarm time interval has elapsed since last transmission of the alarm message, transmitting an alarm message indicating that the event is detected and continuing transmitting the video captured by the camera module 104.

Figure 5:
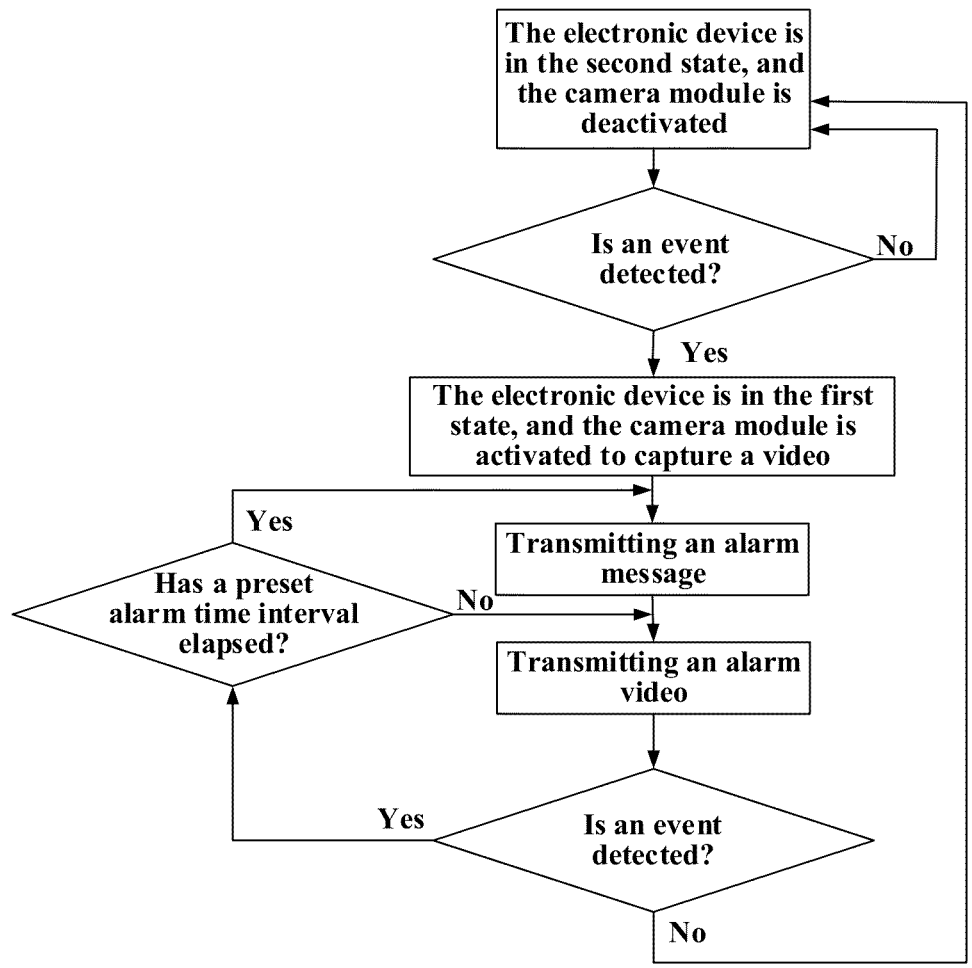
FIG. 5 is a flowchart illustrating an example implementation process for a method of operating an electronic device according to some embodiments of the present disclosure.

Specifically, for example, referring to FIG. 5, it differs from FIG. 3 in that when an event is detected after the alarm message is transmitted, whether the preset alarm time interval has elapsed since the last transmission of the alarm message is further determined. If the preset alarm time interval has not elapsed, no additional alarm message indicating that the event is detected is transmitted anymore. If the preset alarm time interval has elapsed, an additional alarm message is transmitted.

Figure 6:
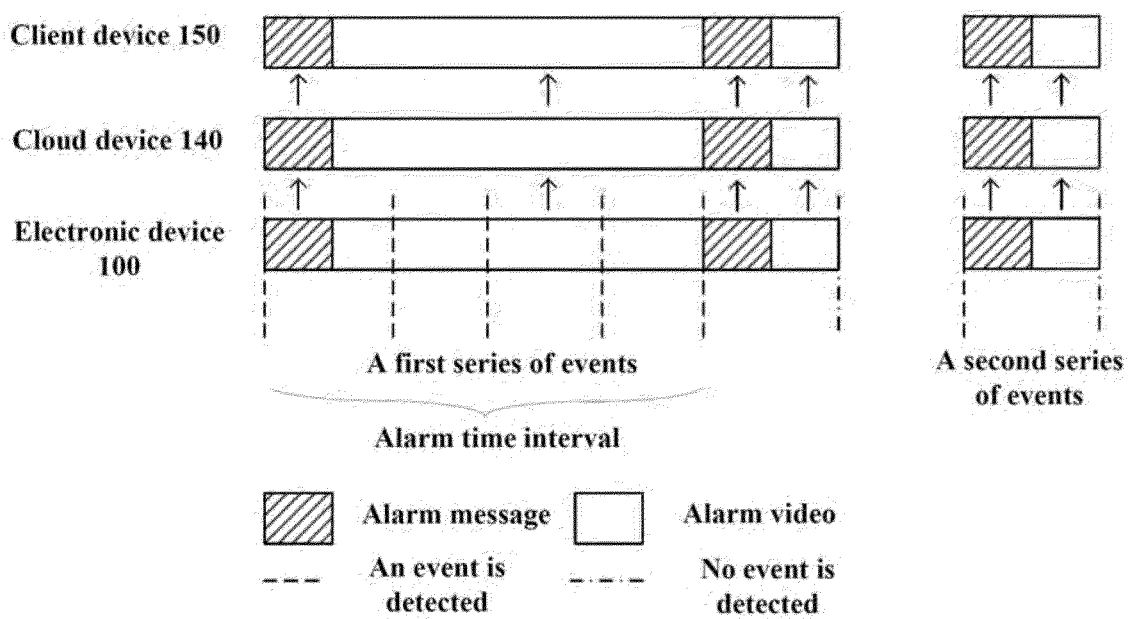
FIG. 6 is a schematic view illustrating a data mapping relationship among an electronic device, a cloud device, and a client device in the example implementation process shown in FIG. 5.

FIG. 6 shows a data mapping relationship among the electronic device 100, the cloud device 140, and the client device 150 in the case shown in FIG. 5. As shown in FIG. 6, when the earliest event in a first series of events is detected, after being woken up, the electronic device 100 pushes an alarm message to the client device 150 via the cloud device 140, and starts to push an alarm video to the client device 150 via the cloud device 140. After that, when a subsequent event in the first series of events is detected, the electronic device 100 keeps video recording and continuously pushes the alarm video. The electronic device 100 does not push any alarm message during the preset alarm time interval, and only pushes an alarm message again when the preset alarm time interval expires. The preset alarm time interval may be set by the user according to the user's own requirements, and may be, for example, 3 minutes to 5 minutes. With such a preset alarm time interval, the user will not be disturbed by frequent alarms, and can conveniently retrieve events of interest, thereby obtaining improved experience.

In some embodiments, the one or more types of events are prioritized. As a non-limiting example, a priority of the object event may be higher than a priority of the motion event, and the priority of the motion event may be higher than a priority of the PIR event. In addition, for example, in the object events, a priority of the humanoid event may be higher than a priority of the pet event, and so on. The prioritization of the events may be default, or may be customized by the user. In some embodiments, the method 200 may include in response to that a first event in the one or more types of events is detected, in a case where the electronic device 100 is in the first state: in response to determining that the first event is an event with the highest priority in the one or more types of events, immediately transmitting an alarm message indicating that the first event is detected, and transmitting, as an alarm video, a video captured by the camera module 104 after the first event is detected; or in response to determining that the first event is not an event with the highest priority in the one or more types of events, waiting for a preset waiting time period, then transmitting an alarm message indicating that an event with the highest priority among the first event and an event detected during the preset waiting time period is detected, and transmitting, as an alarm video, a video captured by the camera module 104 after the event with the highest priority is detected, or transmitting, as an alarm video, a video captured by the camera module 104 after the first event is detected.

Figure 7:
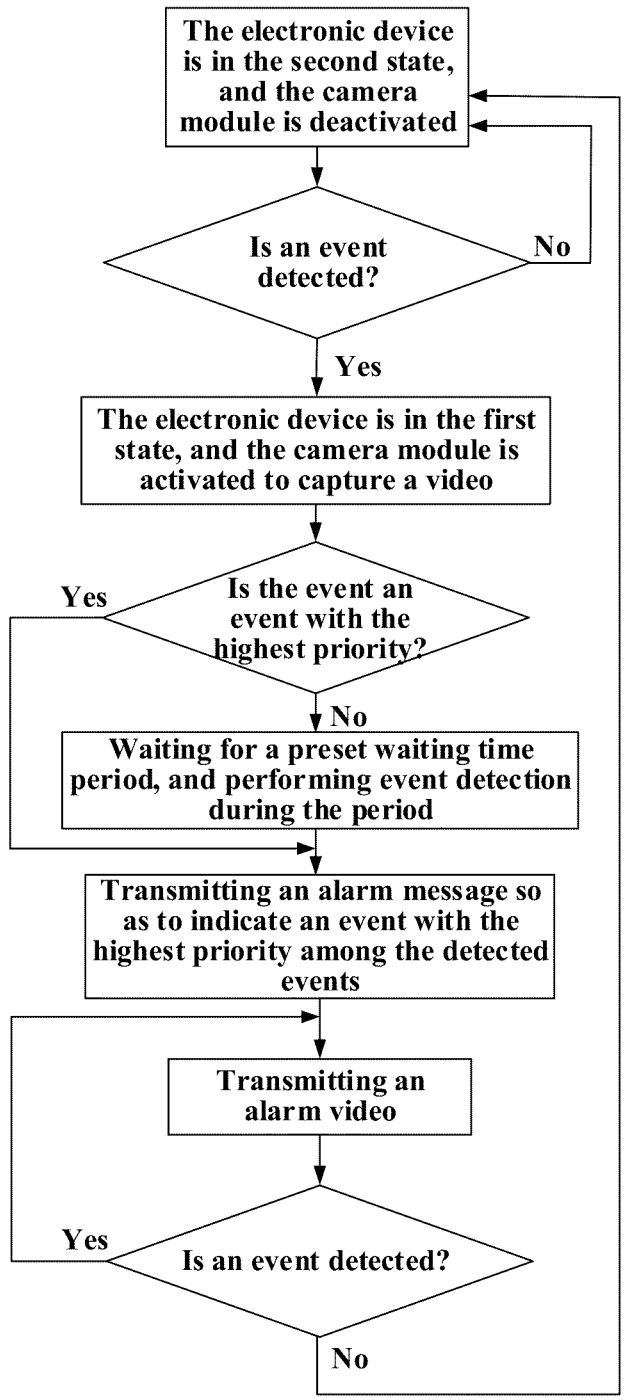
FIG. 7 is a flowchart illustrating an example implementation process for a method of operating an electronic device according to some embodiments of the present disclosure.

Specifically, for example, referring to FIG. 7, it differs from FIG. 3 in that whether the detected event is an event with the highest priority is further determined. If the detected event is the event with the highest priority, an alarm message indicating that the event with the highest priority is detected is immediately transmitted, as well as an alarm video. If the detected event is not the event with the highest priority, the preset waiting time period is waited during which event detection is performed, and when the preset waiting time period expires, an alarm message indicating an event that has been detected so far with the highest priority is transmitted, as well as an alarm video. The preset waiting time period may be set by the user according to his/her requirements, for example, may be 1 second to 2 seconds. Assuming that the priority of the humanoid event is higher than the priority of the pet event, and the priority of the pet event is higher than the priority of the motion event, if the earliest event in this series of events is that the motion event is detected, the electronic device 100 may start video recording first without pushing an alarm message and an alarm video immediately, but waits for one second (the preset waiting time period). If, within the one second, the pet event is further detected but no humanoid event is detected, then when the one second expires, an alarm message indicating the pet event may be pushed, and an alarm video may start from when the motion event is detected or may start from when the pet event is detected. If, within the one second, both the pet event and the humanoid event are further detected, then when the one second expires, an alarm message indicating the humanoid event may be pushed, and an alarm video may start from when the motion event is detected or may start from when the humanoid event is detected. If no pet event or humanoid event is detected within the one second, then when the one second expires, an alarm message indicating the motion event may be pushed, and an alarm video may start from when the motion event is detected. If the earliest event in the series of events is that the humanoid event is detected, the electronic device 100 may start video recording and immediately push an alarm message indicating the humanoid event and the alarm video starting from when the humanoid event is detected. In this way, the user will not be disturbed by frequent alarms, and can be pushed information that the user is more interested in, thereby obtaining improved experience.

In some embodiments, the method 200 may include: in response to that an alarm triggering event, which is configured for triggering an alarm, in the one or more types of events is detected, in a case where the electronic device 100 is in the first state, transmitting an alarm message indicating that the alarm triggering event is detected, and transmitting, as an alarm video, a video captured by the camera module 104 after the alarm triggering event is detected. In some embodiments, the method 200 includes, after the alarm message is transmitted: in response to that an alarm triggering event in the one or more types of events is detected, not transmitting an alarm message indicating that the alarm triggering event is detected but continuing transmitting the video captured by the camera module 104; or in response to that an alarm triggering event in the one or more types of events is not detected, but a non-alarm triggering event in the one or more types of events is detected, not transmitting an alarm message indicating that the non-alarm triggering event is detected and stopping transmitting the video captured by the camera module 104; or in response to that no event in the one or more types of events is detected, stopping transmitting the video captured by the camera module 104.

For example, in some embodiments, the method 200' includes, after transmitting the alarm message indicating that the alarm triggering event is detected: in response to that an alarm triggering event in the one or more types of events is detected, causing the electronic device 100 to be kept in the first state, not transmitting an alarm message indicating that the alarm triggering event is detected but continuing transmitting the video captured by the camera module 104; or in response to that no alarm triggering event in the one or more types of events is detected but a non-alarm triggering event in the one or more types of events is detected, causing the electronic device 100 to be kept in the first state, not transmitting an alarm message indicating that the non-alarm triggering event is detected, and stopping transmitting the video captured by the camera module 104; or in response to that no event in the one or more types of events is detected, stopping transmitting the video captured by the camera module 104, and causing the electronic device 100 to switch from the first state back to the second state. In such an embodiment, the one or more types of events, as video recording triggering events, are further divided into alarm triggering events and non-alarm triggering events. The non-alarm triggering event can only trigger the electronic device 100 to record a video, while the alarm triggering event can not only trigger the electronic device 100 to record a video, but also trigger the electronic device 100 to transmit the alarm message and the alarm video. In addition, for alarm triggering events belonging to the same series, the electronic device 100 transmits only one alarm message (it may be understood that when a preset alarm time interval is set, multiple alarm message may be transmitted).

Figure 8:
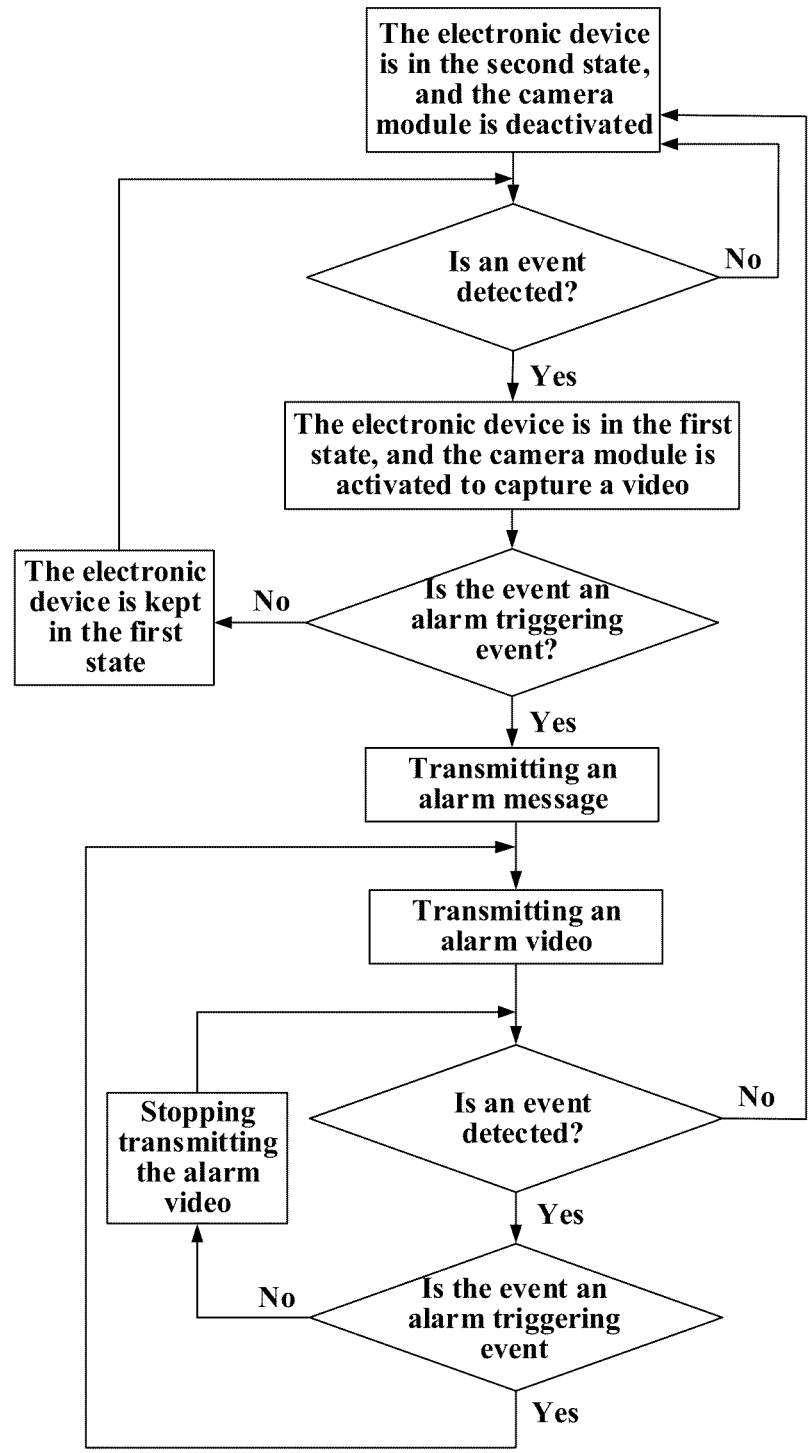
FIG. 8 is a flowchart illustrating an example implementation process for a method of operating an electronic device according to some embodiments of the present disclosure.

Specifically, for example, referring to FIG. 8, it differs from FIG. 3 in that whether a detected event is an alarm triggering event is further determined. If the detected event is not an alarm triggering event, the electronic device 100 is kept in the first state and only captures a video and does not perform a transmission operation. If the detected event is an alarm triggering event, the electronic device 100 transmits an alarm message indicating that the alarm triggering event is detected, and further transmits an alarm video associated with the alarm triggering event. After that, if another alarm triggering event is detected, the electronic device 100 is kept in the first state, but in this case, it transmits only the alarm video without transmitting any alarm message additionally. If an non-alarm triggering event is further detected, the electronic device 100 is kept in the first state, but in this case, it only captures a video but does not perform any transmission operation. Once no event is detected, the electronic device 100 returns to the second state. In this way, the user will not be disturbed by frequent alarms, and can be pushed information which the user is more interested in, and the user is allowed to have a chance to view information that the user is not so interested in originally, thereby obtaining improved experience.

In some embodiments, in the first state, the captured video is locally stored, and the method 200 includes, after the alarm message is transmitted: transmitting, as an alarm video, the video captured by the camera module 104, and when a duration of the transmitted video reaches a preset alarm video duration, stopping transmitting the video captured by the camera module 104 and transmit an extension message indicating existence of a subsequent video of the alarm video.

Figure 9:
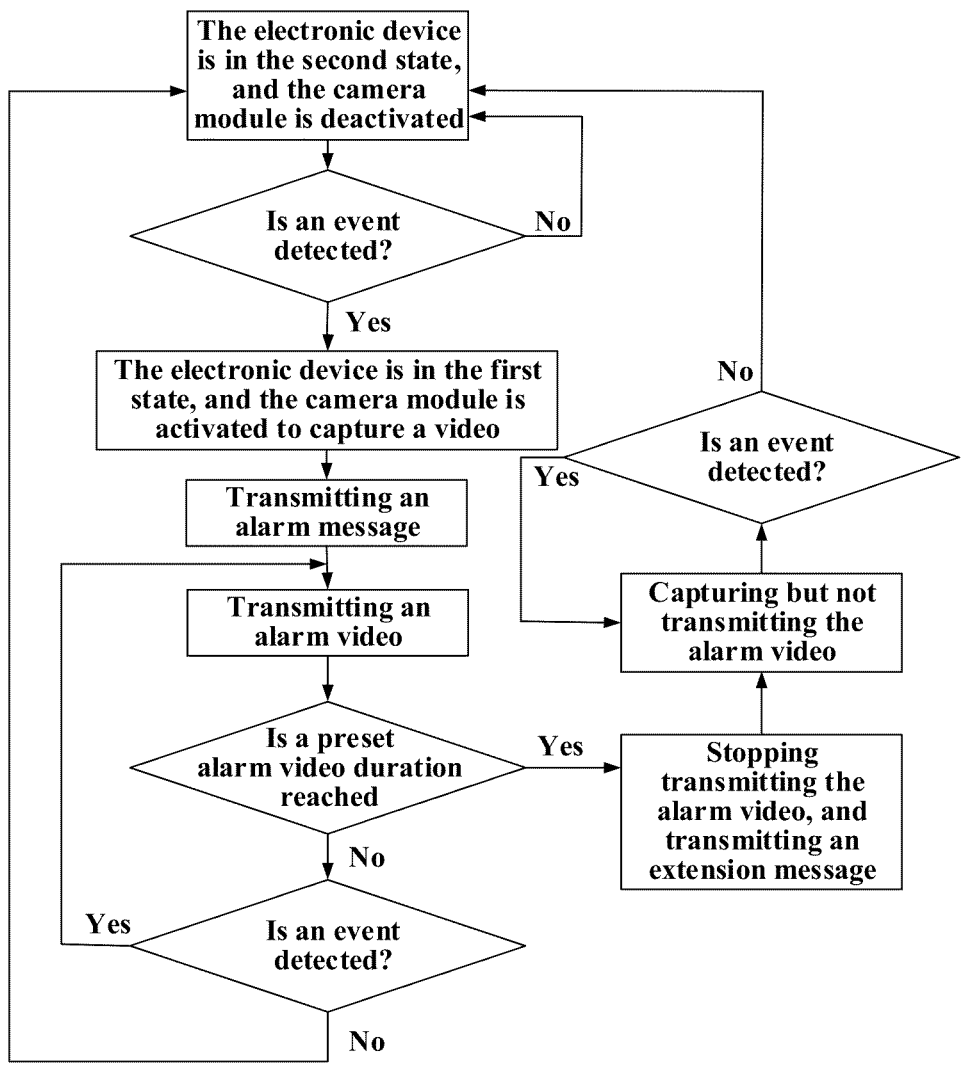
FIG. 9 is a flowchart illustrating an example implementation process for a method of operating an electronic device according to some embodiments of the present disclosure.

Specifically, for example, referring to FIG. 9, it differs from FIG. 3 in that whether a duration of the transmitted video reaches a preset alarm video duration is further determined. If the duration of the transmitted video reaches the preset alarm video duration, the transmission of the alarm video is stopped, and an extension message indicating existence of a subsequent video of the alarm video is transmitted. Subsequently, the electronic device 100 is kept in the first state, and only captures but does not transmit the alarm video, and the captured video is locally stored as the subsequent video of the alarm video for future needs. When no event is detected, the electronic device 100 returns to the second state.

Figure 10:
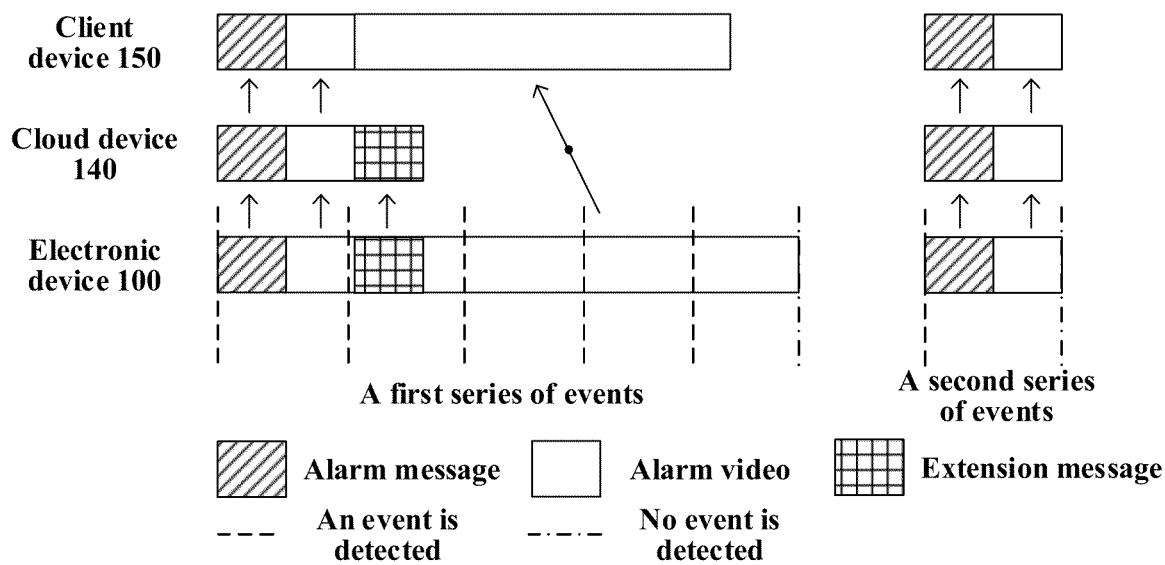
FIG. 10 is a schematic view illustrating a data mapping relationship among an electronic device, a cloud device, and a client device in the example implementation process shown in FIG. 9.

FIG. 10 shows a data mapping relationship among the electronic device 100, the cloud device 140, and the client device 150 in the case shown in FIG. 9. As shown in FIG. 10, when the earliest event in a first series of events is detected, after being woken up, the electronic device 100 pushes an alarm message to the client device 150 via the cloud device 140, and starts to push an alarm video to the client device 150 via the cloud device 140. After that, when a subsequent event in the first series of events is detected, the electronic device 100 keeps recording a video and continuously pushes the alarm video but no longer pushes any alarm message. When a preset alarm video duration is reached, the electronic device 100 no longer pushes the alarm video but pushes an extension message. Since then, until the first series of events end, the electronic device 100 captures the video only and locally stores the captured video as a subsequent video of the alarm video. The preset alarm video duration may be set by the user according to the user's own requirements, for example, may be 15 seconds to 30 seconds. With such a preset alarm video duration, power consumption of the electronic device 100 can be reduced, and storage space occupied in the cloud device 140 can also be reduced.

The user rarely watches all videos associated with an entire series of events, and therefore, transmitting only an alarm video of the preset alarm video duration is sufficient in most cases. Even if the user suddenly wants to see all the videos, the client device 150 may request, via the cloud device 140, the electronic device 100 to transmit the subsequent video. For example, the method 200 may include: transmitting the subsequent video in response to receiving a transmission request for the subsequent video. The alarm message, the alarm video, the extension message, and the subsequent video may be transmitted to the cloud device 140. The cloud device 140 may be configured to receive and store the alarm message, the alarm video, and the extension message and transmit the alarm message and the alarm video to the client device 150. The cloud device 140 may be further configured to forward the subsequent video to the client device 150 without storing the subsequent video. The client device 150 may be configured to: in response to the alarm video being played, query (for example, transmit a query request to the cloud device 140) whether an extension message associated with the alarm video exists; in response to finding that the extension message associated with the alarm video exists (for example, a query result being received from the cloud device 140), request to transmit the subsequent video when time left until the playing of the alarm video ends is not less than a first preset duration and not greater than a second preset duration. The first preset duration may be configured to allow continuous playing of the alarm video and the subsequent video at the client device 150. For example, the first preset duration may be determined according to time required for querying for the extension message and buffering the subsequent video. In this way, the user may be unaware of the switching between the alarm video and the subsequent video. The second preset duration may be greater than or equal to the first preset duration. The second preset duration should not be set too long, for example, it may be set to a length at which there is a relatively high probability of predicting that the user will finish watching the video. For example, when the preset alarm video duration is 15 seconds, the first preset duration may be 1 second to 2 seconds, and the second preset duration may be 3 seconds to 5 seconds.

Referring to FIG. 17 again, the cloud device 140 may include a processor(s) 142 and a memory 144 storing computer-executable instructions which, when executed by the processor 142, cause the processor 142 to perform a method of operating the cloud device 140. For example, the processor 142 may be a central processing unit (CPU) of the cloud device 140. The processor 142 may be any type of general-purpose processor, or may be a processor specifically designed to operate the cloud device 140, such as an application-specific integrated circuit ("ASIC"). The memory 144 may include various computer-readable media that are accessible by the processor 142. In various embodiments, the memory 144 described herein may include volatile and non-volatile media, and removable and non-removable media. For example, the memory 144 may include any combination of the following: a random access memory ("RAM"), a dynamic RAM ("DRAM"), a static RAM ("SRAM"), a read-only memory ("ROM"), a flash memory, a cache memory, and/or any other type of non-transitory computer-readable medium. The memory 144 may store instructions that, when executed by the processor 142, cause the processor 142 to perform the method of operating the cloud device 140. A method 1100 of operating the cloud device 140 according to an embodiment of the present disclosure will be described in detail below with reference to FIG. 13 and FIG. 14.

Figure 13:
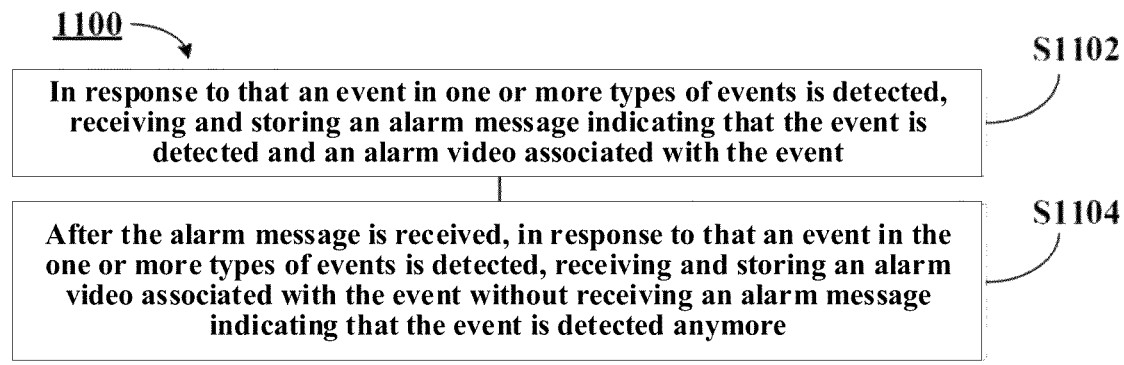
FIG. 13 and FIG. 14 are flowcharts illustrating a method of operating a cloud device according to some embodiments of the present disclosure.

As shown in FIG. 13, the method 1100 includes: at block S1102, in response to that an event in one or more types of events is detected, receiving and storing an alarm message indicating that the event is detected and an alarm video associated with the event; at block S1104, after the alarm message is received, in response to that an event in the one or more types of events is detected, receiving and storing an alarm video associated with the event without receiving an alarm message indicating that the event is detected anymore. In some embodiments, the method 1100 further includes: in response to that no event in the one or more types of events is detected, no longer receiving an alarm message and an alarm video.

Figure 14:
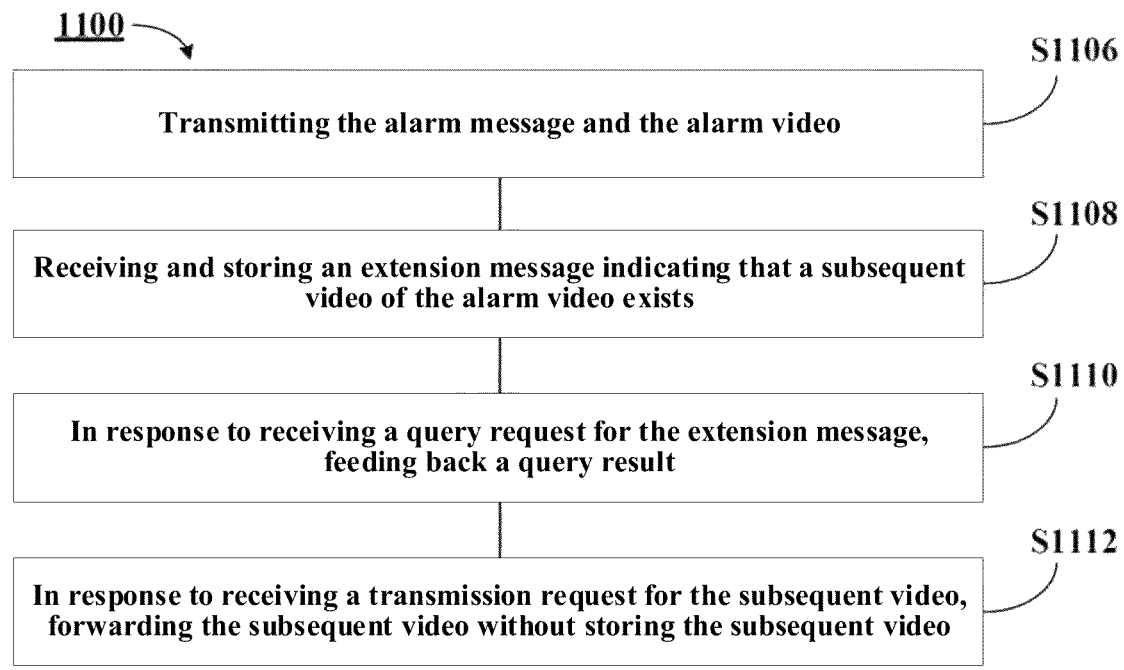

In some embodiments, as shown in FIG. 14, the method 1100 may further include: at block S1106, transmitting the alarm message and the alarm video; at block S1108, receiving and storing an extension message indicating existence of a subsequent video of the alarm video; at block S1110, in response to receiving a query request for the extension message, feeding back a query result; and at block S1112, in response to receiving a transmission request for the subsequent video, forwarding the subsequent video without storing the subsequent video. For example, the alarm message, the alarm video, the extension message, and the subsequent video may be received by the cloud device 140 from the electronic device 100, the query request may be received by the cloud device 140 from the client device 150, and the alarm message, the alarm video, the query result, and the subsequent video may be transmitted by the cloud device 140 to the client device 150. In some embodiments, the cloud device 140 may also be configured to transmit the extension message to the client device 150, so that the client device 150 may locally query for the extension message without querying the cloud device 140 for the extension message. For embodiments of the method 1100, reference may be similarly made to the descriptions of the embodiments of the methods 200, 200', and 200'', which will not be repeated herein.

Referring to FIG. 17 again, the client device 150 may include a processor(s) 152 and a memory 154 storing computer-executable instructions which, when executed by the processor 152, cause the processor 152 to perform a method of operating the client device 150. For example, the processor 152 may be a central processing unit (CPU) of the client device 150. The processor 152 may be any type of general-purpose processor, or may be a processor specifically designed to operate the client device 150, such as an application-specific integrated circuit ("ASIC"). The memory 154 may include various computer-readable media that are accessible by the processor 152. In various embodiments, the memory 154 described herein may include volatile and non-volatile media, and removable and non-removable media. For example, the memory 154 may include any combination of the following: a random access memory ("RAM"), a dynamic RAM ("DRAM"), a static RAM ("SRAM"), a read-only memory ("ROM"), a flash memory, a cache memory, and/or any other type of non-transitory computer-readable medium. The memory 154 may store instructions that, when executed by the processor 152, cause the processor 152 to perform the method of operating the client device 150. A method 1200 of operating the client device 150 according to an embodiment of the present disclosure will be described in detail below with reference to FIG. 15 and FIG. 16.

Figure 15:
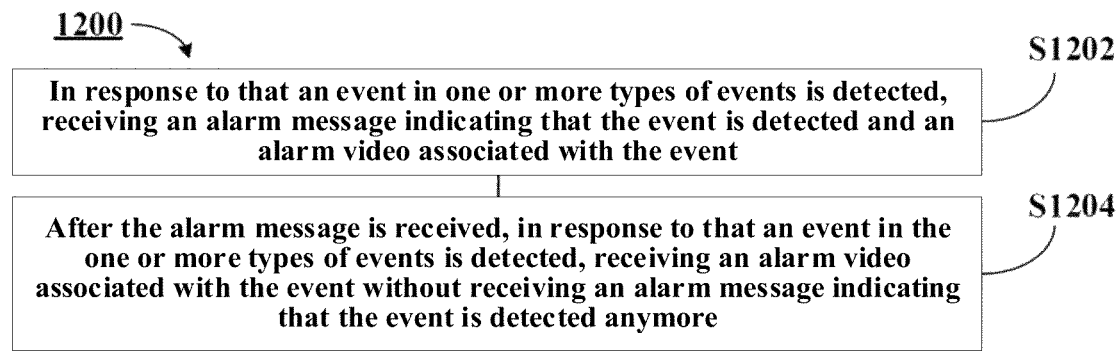
FIG. 15 and FIG. 16 are flowcharts illustrating a method of operating a client device according to some embodiments of the present disclosure.

As shown in FIG. 15, the method 1200 includes: at block S1202, in response to that an event in one or more types of events is detected, receiving an alarm message indicating that the event is detected and an alarm video associated with the event; at block S1204, after the alarm message is received, in response to that an event in the one or more types of events is detected, receiving an alarm video associated with the event without receiving an alarm message indicating that the event is detected anymore. In some embodiments, the method 1200 further includes: in response to that no event in the one or more types of events is detected, no longer receiving an alarm message and an alarm video.

Figure 16:
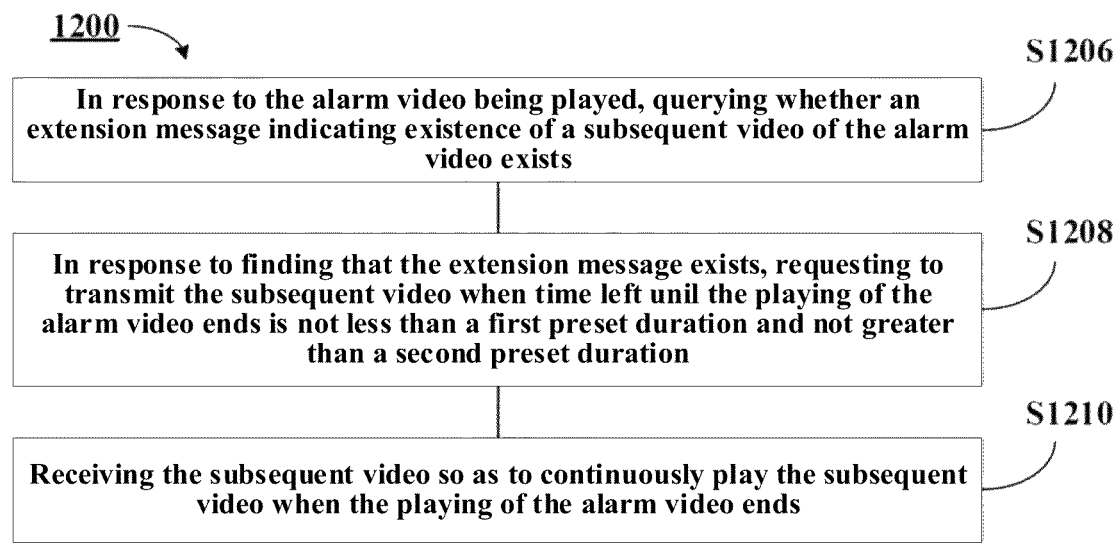

In some embodiments, as shown in FIG. 16, the method 1200 may further include: at block S1206, in response to the alarm video being played, querying whether an extension message indicating existence of a subsequent video of the alarm video exists; at block S1208, in response to finding that the extension message exists, requesting to transmit the subsequent video when time left until the playing of the alarm video ends is not less than a first preset duration and not greater than a second preset duration, wherein the first preset duration is configured to allow continuous playing of the alarm video and the subsequent video at the client device 150, and the second preset duration is greater than or equal to the first preset duration; and at block S1210, receiving the subsequent video so as to continuously play the subsequent video when the playing of the alarm video ends. For example, the alarm message, the alarm video, the query result, and the subsequent video may be received by the client device 150 from the cloud device 140, and the query request for the extension message and the transmission request for the subsequent video may be transmitted by the client device 150 to the cloud device 140. In some other embodiments, for example, when the client device 150 directly interacts with the electronic device 100, the alarm message, the alarm video, the query result, and the subsequent video may be received by the client device 150 from the electronic device 100, and the query request for the extension message and the transmission request for the subsequent video may be transmitted by the client device 150 to the electronic device 100. In some embodiments, the client device 150 may also be configured to receive the extension message, so that it can query for the extension message locally. If the client device 150 does not find the extension message, the operation can end after the playing of the alarm video ends. For embodiments of the method 1200, reference may be similarly made to the descriptions of the embodiments of the methods 200, 200', and 200'' and the method 1100, which will not be repeated herein.

The present disclosure may further provide a non-transitory storage medium having computer-executable instructions stored thereon, the computer-executable instructions, when executed by one or more processors, causing the one or more processors to perform the method 200, 200', 200'' of operating the electronic device 100 according to any one of the foregoing embodiments of the present disclosure.

The present disclosure may further provide a non-transitory storage medium having computer-executable instructions stored thereon, the computer-executable instructions, when executed by one or more processors, causing the one or more processors to perform the method 1100 of operating the cloud device 140 according to any one of the foregoing embodiments of the present disclosure.

The present disclosure may further provide a non-transitory storage medium having computer-executable instructions stored thereon, the computer-executable instructions, when executed by one or more processors, causing the one or more processors to perform the method 1200 of operating the client device 150 according to any one of the foregoing embodiments of the present disclosure.

The words "left", "right", "front", "rear", "top", "bottom", "above", "under", "upper", "lower" and the like in the description and the claims, if present, are used for a descriptive purpose and are not necessarily used for describing unchanged relative positions. It should be understood that the words used in such a way are interchangeable in proper circumstances so that the embodiments of the present disclosure described herein, for example, can be operated in other orientations that are different from those shown herein or those described otherwise. For example, when the apparatus in the figure is reversed, the feature originally described as being "above" another feature may now be described as being "below" the other feature. The apparatus may also be oriented in other ways (rotated 90 degrees or in other orientations), and the relative spatial relationship will be explained correspondingly.

In the description and claims, when an element is referred to as being "above", "attached" to, "connected" to, "coupled" to, or "in contact" with another element, the element may be directly above, directly attached to, directly connected to, directly coupled to, or directly in contact with the other element, or there may be one or more intermediate elements. By contrast, when an element is referred to as "directly above", "directly attached" to, "directly connected" to, "directly coupled" to, or "directly in contact" with another element, there will be no intermediate element. In the description and claims, a feature being arranged "adjacent" to another feature may refer to the feature having a portion that overlaps with the adjacent feature or a portion located above or below the adjacent feature.

For example, as used herein, the word "exemplary" means "used as an example, instance, or illustration", and is not intended to be a "model" to be accurately copied. Any implementation exemplarily described herein is not necessarily to be construed as preferred or advantageous over other implementations. In addition, the present disclosure is not limited by any stated or implied theory provided in the technical field, background, summary or detailed description.

As used herein, the word "substantially" means that any minor variation caused by the defect of the design or manufacture, the tolerance of the device or the element, the environmental impact, and/or other factors is included. The word "substantially" also allows for the difference from the perfect or ideal situation caused by the parasitic effect, noise, and other practical considerations that may exist in the actual implementation.

Furthermore, terms like "first" and "second" and so on may also be used herein for a reference purpose only, and thus are not intended for a limitation. For example, the terms "first" "second" and other such numerical terms relating to the structure or element do not imply the sequence or the order unless the context clearly indicates otherwise.

It should be further understood that the word "include/comprise", when used herein, specifies the presence of stated features, integers, steps, operations, units, and/or components, but do not preclude the presence or addition of one or more other features, integers, steps, operations, units, and/or components, and/or combinations thereof.

In the present disclosure, the term "provide" is used broadly for covering all manners of obtaining the object, therefore "provide an object" includes, but not limited to, "purchase", "prepare/manufacture", "arrange/set", "install/assemble", and/or "order" the object.

As used herein, the term "and/or" includes any and all combinations of one or more of the listed items associated with it. The terms used herein are only for the purpose of describing specific embodiments and are not intended to limit the present disclosure. As used herein, the singular forms "a", "an", and "the" are also intended to include the plural form, unless the context clearly indicates otherwise.

A person skilled in the art should be aware that the boundaries between the foregoing operations are merely illustrative. Multiple operations may be combined into a single operation, a single operation may be distributed in an additional operation, and the operations may be performed at least partially overlapping in time. In addition, alternative embodiments may include a plurality of instances of a particular operation, and the operation order may be changed in other various embodiments. However, other modifications, changes, and replacements are also possible. Aspects and elements of all the embodiments disclosed above may be combined in any way and/or in combination with aspects or elements of other embodiments to provide multiple additional embodiments. Therefore, the description and accompanying drawings are to be regarded as illustrative rather than restrictive.

Although some specific embodiments of the present disclosure have been described in detail through examples, those skilled in the art should understand that the foregoing examples are only for description, but not for limiting the scope of the present disclosure. The embodiments disclosed herein may be arbitrarily combined without departing from the spirit and scope of the present disclosure. Those skilled in the art should also understand that various modifications may be made to the embodiments without departing from the scope and spirit of the present disclosure. The scope of the present disclosure is defined by the attached claims.

What is claimed is:

1. A method of operating an electronic device, the electronic device comprising a camera module configured to capture a video, the electronic device having a first state in which the camera module is activated to capture a video, the method comprising:
   in response to a first event in one or more types of events being detected, in a case where the electronic device is in the first state, transmitting an alarm message indicating that the first event is detected, and transmitting, as an alarm video, a video captured by the camera module after the first event is detected; and
   after the alarm message is transmitted, in response to a second event in the one or more types of events being detected, not transmitting an alarm message indicating that the second event is detected, but continuing transmitting the video captured by the camera module, wherein the first and second events are two events of a same series of events, the same series of events comprising multiple events associated with each other that are caused by an object appearing in a field of view, continuously performing activities in the field of view, and then leaving the field of view,
   wherein the one or more types of events are prioritized, and the method comprises in response to the first event in the one or more types of events being detected, in a case where the electronic device is in the first state:

in response to determining that the first event is an event with the highest priority in the one or more types of events, immediately transmitting an alarm message indicating that the first event is detected, and transmitting, as an alarm video, a video captured by the camera module after the first event is detected; or in response to determining that the first event is not an event with the highest priority in the one or more types of events, waiting for a preset waiting time period, then transmitting an alarm message indicating that an event with the highest priority among the first event and an event detected during the preset waiting time period is detected, and transmitting, as an alarm video, a video captured by the camera module after the event with the highest priority is detected, or transmitting, as an alarm video, a video captured by the camera module after the first event is detected.

2. The method according to claim 1, wherein the electronic device further has a second state in which the camera module is deactivated, and the method comprises:

causing the electronic device to be in the second state by default;

in response to the first event in the one or more types of events being detected, causing the electronic device to switch from the second state to the first state, wherein the transmission of the alarm message and the alarm video is performed after the electronic device switches from the second state to the first state.

3. The method according to claim 1, comprising: causing the electronic device to be kept in the first state.

4. The method according to claim 1, comprising:

in response to an alarm triggering event, which is configured for triggering an alarm, in the one or more types of events is detected, in a case where the electronic device is in the first state, transmitting an alarm message indicating that the alarm triggering event is detected, and transmitting, as an alarm video, a video captured by the camera module after the alarm triggering event is detected.

5. The method according to claim 4, comprising, after the alarm message is transmitted:

in response to the alarm triggering event in the one or more types of events being detected, not transmitting an alarm message indicating that the alarm triggering event is detected but continuing transmitting the video captured by the camera module; or in response to the no alarm triggering event in the one or more types of events being detected but a non-alarm triggering event in the one or more types of events is detected, not transmitting an alarm message indicating that the non-alarm triggering event is detected and stopping transmitting the video captured by the camera module; or in response to no event in the one or more types of events being detected, stopping transmitting the video captured by the camera module.

6. The method according to claim 1, wherein in the first state, the captured video is locally stored, and the method comprises, after the alarm message is transmitted:

transmitting, as the alarm video, the video captured by the camera module, and when a duration of the transmitted video reaches a preset alarm video duration, stopping transmitting the video captured by the camera module and transmitting an extension message indicating existence of a subsequent video of the alarm video.

7. The method according to claim 6, wherein the alarm message, the alarm video, and the extension message are transmitted to a cloud device, and the cloud device is configured to receive and store the alarm message, the alarm video, and the extension message, and transmit the alarm message and the alarm video to a client device; and wherein the cloud device is configured to forward the subsequent video from the electronic device to the client device without storing the subsequent video in response to receiving a transmission request for the subsequent video.

8. The method according to claim 7, wherein the client device is configured to:

in response to the alarm video being played, query whether an extension message associated with the alarm video exists;

in response to finding that the extension message associated with the alarm video exists, when time left until the playing of the alarm video ends is not less than a first preset duration and not greater than a second preset duration, request to transmit the subsequent video, wherein the first preset duration is configured to allow continuous playing of the alarm video and the subsequent video at the client device, and the second preset duration is greater than or equal to the first preset duration.

9. An electronic device, comprising:

a camera module configured to capture a video;

one or more processors; and a memory storing computer-executable instructions which, when executed by the one or more processors, cause the one or more processors to perform the method of operating an electronic device according to claim 1.

10. A method of operating a cloud device, comprising:

in response to that a first event in one or more types of events being detected, receiving and storing an alarm message indicating that the first event is detected and an alarm video associated with the first event; and after the alarm message is received, in response to that a second event in the one or more types of events being detected, receiving and storing an alarm video associated with the second event without receiving an alarm message indicating that the second event is detected, wherein the first and second events are two events of a same series of events, the same series of events comprising multiple events associated with each other that are caused by an object appearing in a field of view, continuously performing activities in the field of view, and then leaving the field of view, wherein the one or more types of events are prioritized, and the method comprises in response to the first event in the one or more types of events being detected;

in response to that the first event is an event with the highest priority in the one or more types of events, receiving and storing an alarm message indicating that the first event is detected, and receiving and storing, as an alarm video, a video captured by the camera module after the first event is detected; or in response to that the first event is not an event with the highest priority in the one or more types of events, after a preset waiting time period, receiving and storing an alarm message indicating that an event with the highest priority among the first event and an event detected during the preset waiting time period is detected, and receiving and storing, as an alarm video, a video captured by the camera module after the event with the highest priority is detected, or receiving and storing, as an alarm video, a video captured by the camera module after the first event is detected.

11. The method according to claim 10, further comprising:
transmitting the alarm message and the alarm video;
receiving and storing an extension message indicating existence of a subsequent video of the alarm video;
in response to receiving a query request for the extension message, feeding back a query result; and
in response to receiving a transmission request for the subsequent video, forwarding the subsequent video without storing the subsequent video.

12. A cloud device, comprising:
one or more processors; and
a memory storing computer-executable instructions which, when executed by the one or more processors, cause the one or more processors to perform the method of operating a cloud device according to claim 10.

13. A method of operating a client device, comprising:
in response to that a first event in one or more types of events being detected, receiving an alarm message indicating that the first event is detected and an alarm video associated with the first event; and
after the alarm message is received, in response to that a second event in the one or more types of events being detected, receiving an alarm video associated with the second event without receiving an alarm message indicating that the second event is detected, wherein the first and second events are two events of a same series of events, the same series of events comprising multiple events associated with each other that are caused by an object appearing in a field of view, continuously performing activities in the field of view, and then leaving the field of view,
wherein the one or more types of events are prioritized, and the method comprises in response to the first event in the one or more types of events being detected;
in response to that the first event is an event with the highest priority in the one or more types of events, receiving an alarm message indicating that the first event is detected, and receiving, as an alarm video, a video captured by the camera module after the first event is detected; or
in response to that the first event is not an event with the highest priority in the one or more types of events, after a preset waiting time period, receiving an alarm message indicating that an event with the highest priority among the first event and an event detected during the preset waiting time period is detected, and receiving, as an alarm video, a video captured by the camera module after the event with the highest priority is detected, or receiving, as an alarm video, a video captured by the camera module after the first event is detected.

14. A method of operating a client device, comprising:
in response to that a first event in one or more types of events being detected, receiving an alarm message indicating that the first event is detected and an alarm video associated with the first event;
after the alarm message is received, in response to that a second event in the one or more types of events being detected, receiving an alarm video associated with the second event without receiving an alarm message indicating that the second event is detected, wherein the first and second events are two events of a same series of events, the same series of events comprising multiple events associated with each other that are caused by an object appearing in a field of view, continuously performing activities in the field of view, and then leaving the field of view;
in response to the alarm video being played, querying whether an extension message indicating existence of a subsequent video of the alarm video exists;
in response to finding that the extension message exists, when time left until the playing of the alarm video ends is not less than a first preset duration and not greater than a second preset duration, requesting to transmit the subsequent video, wherein the first preset duration is configured to allow continuous playing of the alarm video and the subsequent video at the client device, and the second preset duration is greater than or equal to the first preset duration; and
receiving the subsequent video to continuously play the subsequent video when the playing of the alarm video ends.

15. A client device, comprising:
one or more processors; and
a memory storing computer-executable instructions which, when executed by the one or more processors, cause the one or more processors to perform the method of operating a client device according to claim 13.

* * * * *